(12) United States Patent
Song

(10) Patent No.: US 11,938,769 B2
(45) Date of Patent: Mar. 26, 2024

(54) LEAF SPRING APPARATUS FOR VEHICLE SUSPENSION

(71) Applicant: HYUNDAI MOBIS Co., Ltd., Seoul (KR)

(72) Inventor: Woo Bin Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/086,107

(22) Filed: Dec. 21, 2022

(65) Prior Publication Data

US 2023/0373260 A1  Nov. 23, 2023

(30) Foreign Application Priority Data

May 18, 2022 (KR) .................. 10-2022-0060769

(51) Int. Cl.
*B60G 11/10* (2006.01)
*B60B 35/00* (2006.01)
*B60B 35/02* (2006.01)
*B60G 11/08* (2006.01)

(52) U.S. Cl.
CPC .......... *B60G 11/10* (2013.01); *B60B 35/004* (2013.01); *B60B 35/02* (2013.01); *B60G 11/08* (2013.01); *B60G 2202/114* (2013.01); *B60G 2204/121* (2013.01); *B60G 2204/15* (2013.01); *B60G 2206/60* (2013.01); *B60G 2206/7101* (2013.01)

(58) Field of Classification Search
CPC ... B60G 11/10; B60G 11/08; B60G 2202/114; B60G 2204/121; B60G 2204/15; B60G 2206/60; B60G 2206/7101; B60B 35/004; B60B 35/02

See application file for complete search history.

(56) References Cited

U.S. PATENT DOCUMENTS

| | | | |
|---|---|---|---|
| 9,073,400 B2* | 7/2015 | Perri | B60G 7/008 |
| 9,162,546 B2* | 10/2015 | Girelli Consolaro | B60G 21/0551 |
| 10,500,913 B1* | 12/2019 | Whitney | B60G 5/047 |
| 10,807,426 B2* | 10/2020 | Girelli Consolaro | B60G 3/20 |
| 11,267,303 B2* | 3/2022 | Senoo | B60G 3/20 |
| 2015/0061255 A1* | 3/2015 | Girelli Consolaro | F16F 1/30 280/124.171 |
| 2016/0288603 A1* | 10/2016 | Gerber | B60G 11/08 |
| 2016/0347139 A1* | 12/2016 | Drabon | B60G 9/00 |
| 2019/0176554 A1* | 6/2019 | Meier | B60G 17/0157 |
| 2019/0351961 A1* | 11/2019 | Zhang | B62D 65/024 |
| 2020/0031189 A1* | 1/2020 | Prikkel, III | B60G 11/04 |
| 2020/0262264 A1* | 8/2020 | Berlingieri | B60G 11/10 |
| 2020/0346506 A1* | 11/2020 | Laforce | B60G 9/003 |

FOREIGN PATENT DOCUMENTS

KR   10-2021-0147535 A   12/2021

* cited by examiner

*Primary Examiner* — Paul N Dickson
*Assistant Examiner* — Shams Dhanani
(74) *Attorney, Agent, or Firm* — MORGAN, LEWIS & BOCKIUS LLP

(57) ABSTRACT

A leaf spring apparatus for a vehicle suspension includes a leaf spring, a carrier disposed on an end portion of the leaf spring and mounted on a wheel of a vehicle, a first connection unit connecting the end portion of the leaf spring and the carrier to each other, a cross member disposed on top of the leaf spring and supporting a body of the vehicle, and a second connection unit connecting the leaf spring and the cross member to each other.

14 Claims, 5 Drawing Sheets

LEAF SPRING APPARATUS FOR VEHICLE SUSPENSION

CROSS-REFERENCE TO RELATED APPLICATION

This application claims the benefit under 35 U.S.C. § 119(a) of priority to Korean Patent Application No. 10-2022-0060769 filed on May 18, 2022 in the Korean Intellectual Property Office, the entire disclosure of which is incorporated herein by reference for all purposes.

BACKGROUND

Technical Field

The present disclosure relates to a leaf spring apparatus for a vehicle suspension and, more particularly, to a leaf spring apparatus for a vehicle suspension, the apparatus being capable of reducing a weight of a vehicle and securing a space for a battery.

Discussion of the Background

In recent years, an increasing number of environment-friendly vehicles such as electric vehicle have been developed. The electric vehicles need to secure a space for arranging a high-capacity battery and to reduce vehicle weight in order to increase an all-electric range (AER).

Vehicle suspensions in the related art are each configured with various types of arms, a coil spring, a set bar, and the like, and thus have a complex structure. Moreover, it is difficult to secure a package space in the electric vehicles.

In addition, it is difficult to lower a floor height of a vehicle body when a coil spring is used in the vehicle suspensions having the structure described above. Moreover, when a steel leaf spring is used in the vehicle suspensions having the structure described above, there occurs a problem in that the vehicle weight is increased and that an occupant can feel uncomfortable in riding in the electric vehicles equipped with vehicle suspensions having the structure described above. Therefore, there is a need to solve these problems.

The background art of the present disclosure is disclosed in Korean Patent Application Publication No. 10-2021-0147535 (published on Dec. 7, 2021 and entitled "LEAF SPRING SUSPENSION SYSTEM."

SUMMARY

An object of the present disclosure, which is contrived to solve the above-mentioned problems, is to provide a leaf spring apparatus for a vehicle suspension, the apparatus being capable of reducing a weight of a vehicle and securing a space for a battery.

According to an aspect of the present disclosure, there is provided a leaf spring apparatus for a vehicle suspension, the apparatus including: a leaf spring; a carrier disposed on an end portion of the leaf spring and mounted on a wheel of the vehicle; a first connection unit connecting the end portion of the leaf spring and the carrier to each other; a cross member disposed on top of the leaf spring and supporting a body of the vehicle; and a second connection unit connecting the leaf spring and the cross member to each other.

In the leaf spring apparatus, the first connection unit may include: a first connection body mounted on the end portion of the leaf spring; one or more first hollow portions formed on a surface of the first connection body and including a through-hole; one or more first rotation supports inserted into the through-hole of the one or more first hollow portions, respectively, and rotatably supporting the carrier; and a first fastening portion connecting the first connection body and the leaf spring to each other.

In the leaf spring apparatus, the first connection body may be formed in such a manner as to be open at the side that faces the end portion of the leaf spring, and the end portion of the leaf spring may be accommodated in the first connection body.

In the leaf spring apparatus, a plurality of the first hollow portions may be arranged on the one surface of the first connection body in such a manner as to be spaced away from each other, and one side of the carrier may be inserted between a plurality of the first hollow portions.

In the leaf spring apparatus, the second connection unit may include: a second connection body disposed on top of the leaf spring; a plurality of second hollow portions formed on first and second end portions of the second connection body, respectively and having a through-hole; a plurality of second rotation supports inserted into the plurality of second hollow portions, respectively, and engaged to the cross member to rotatably support the cross member; and a second fastening portion connecting the second connection body and the leaf spring to each other.

In the leaf spring apparatus, the second connection unit may further include a second connection support disposed underneath the leaf spring and mounted on the leaf spring by the second fastening portion.

In the leaf spring apparatus, the second connection support may include: a second connection base disposed underneath the leaf spring; and a plurality of second connection lateral portions protruding from first and second end portions of the second connection base, respectively, and surrounding a lateral surface of the leaf spring in a width direction of the leaf spring.

In the leaf spring apparatus, the leaf spring may be made of glass fiber reinforced plastics (GFRP).

With a leaf spring apparatus for a vehicle suspension according to an embodiment of the present disclosure, the space for accommodating the battery can be secured, and thus an all-electric range (AER) for an electric vehicle can be increased.

In addition, according to the present disclosure, a space for an occupant can be secured, and thus the occupant can feel more comfortable in riding in the electric vehicle.

In addition, according to the present disclosure, the number of components and the man-hours for assembling the components can be reduced, thereby improving the productivity.

In addition, according to the present disclosure, the leaf spring is made of a composite material, such as GFRP. Accordingly, vehicle weight can be reduced, and thus, vehicle fuel efficiency can be improved.

DETAILED DESCRIPTION OF THE ILLUSTRATED EMBODIMENTS

Figure 1:
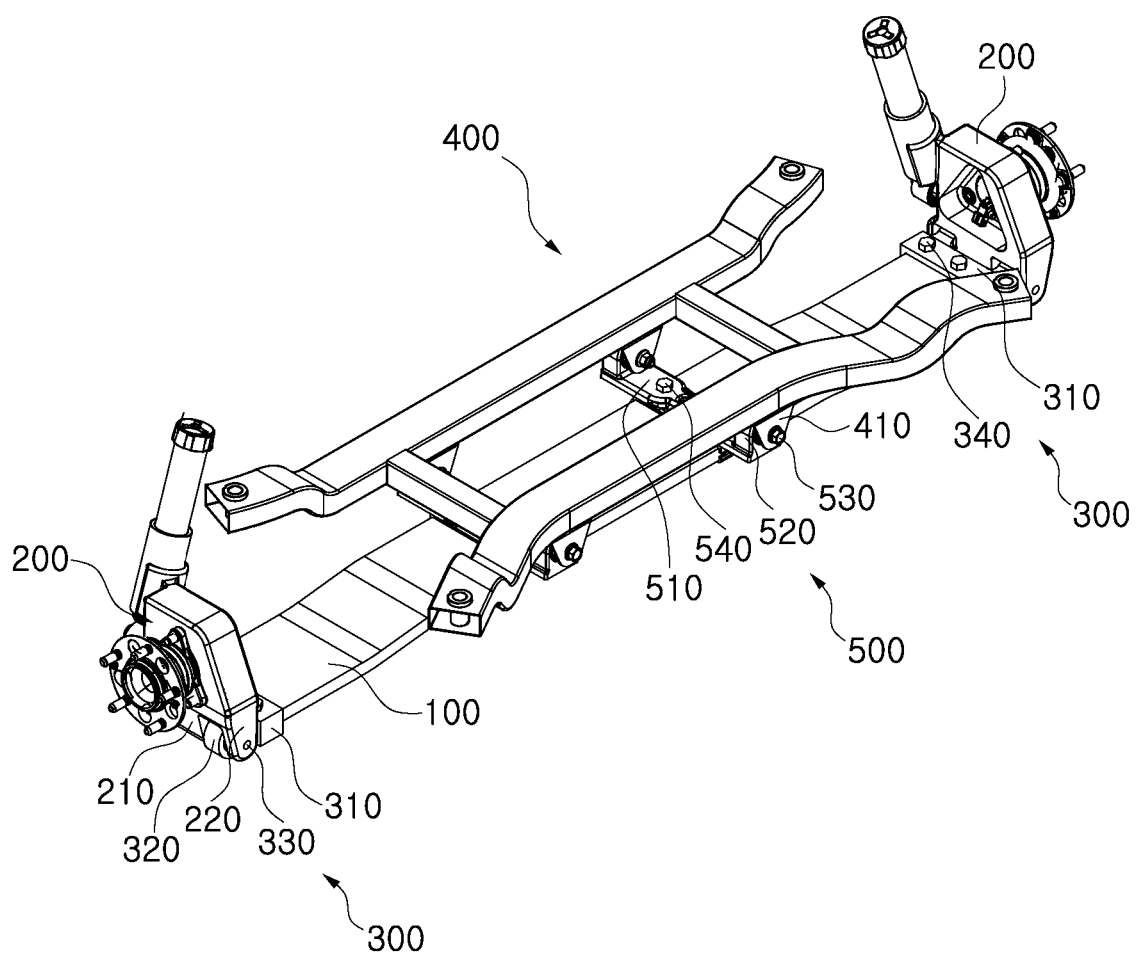
FIG. 1 is a perspective view schematically illustrating a leaf spring apparatus for a vehicle suspension according to an embodiment of the present disclosure.

A leaf spring apparatus for a vehicle suspension according to an embodiment of the present disclosure will be described below with reference to the accompanying drawings. For clarity and convenience in description, thicknesses of lines and sizes of constituent elements may be illustrated in non-exact proportion in the drawings.

In addition, a term defined by considering the meaning thereof in the present disclosure will be used below and may vary according to the user's or manager's intention or to practices in the art. Therefore, the term should be defined in context in light of the present specification.

Figure 2:
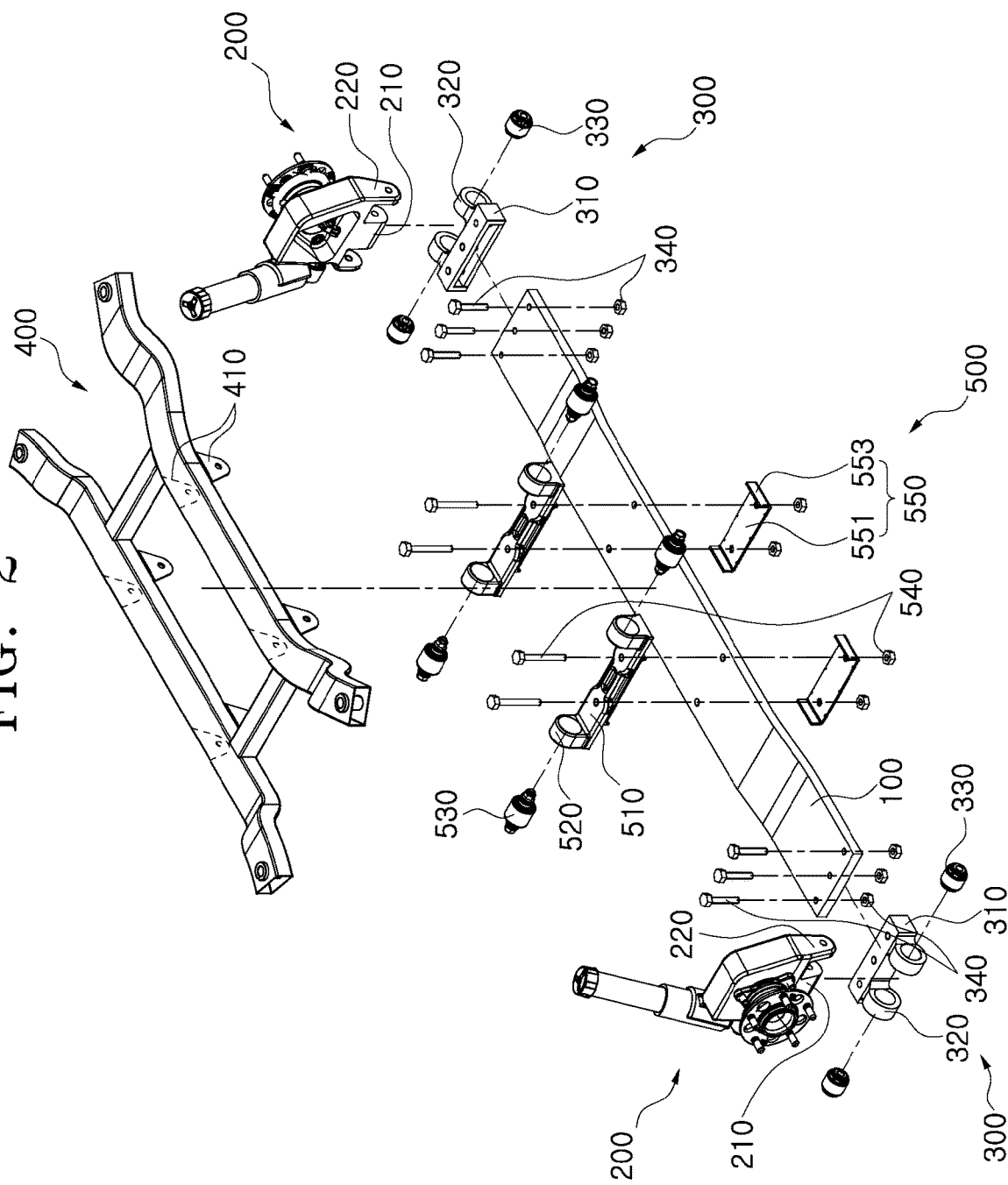
FIG. 2 is a perspective view schematically illustrating that the leaf spring apparatus for a vehicle suspension according to the embodiment of the present disclosure is assembled.
Figure 3:
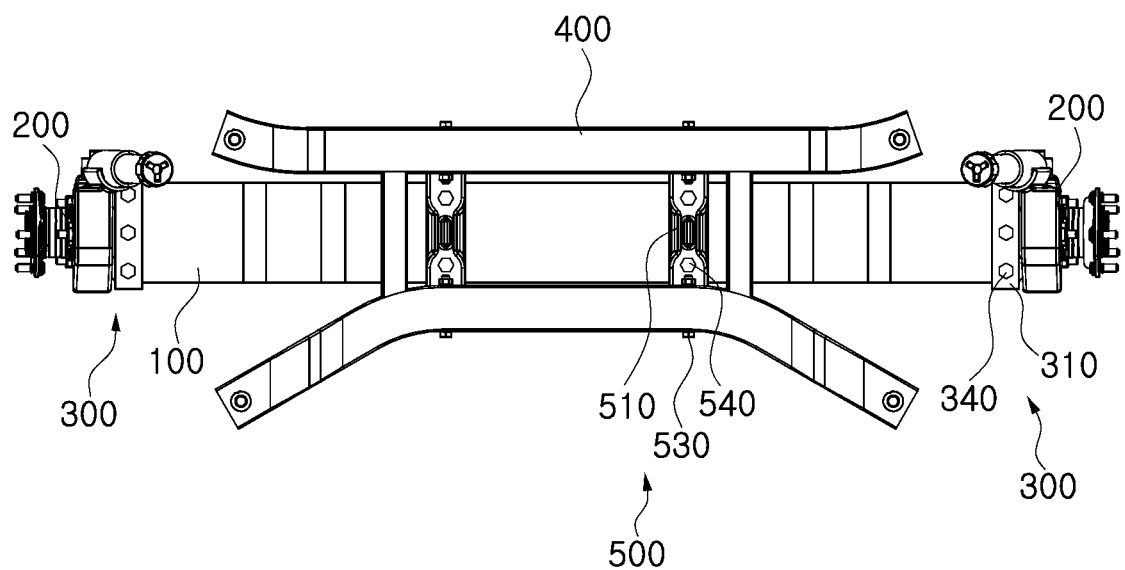
FIG. 3 is a plan view schematically illustrating the leaf spring apparatus for a vehicle suspension according to the embodiment of the present disclosure.
Figure 4:
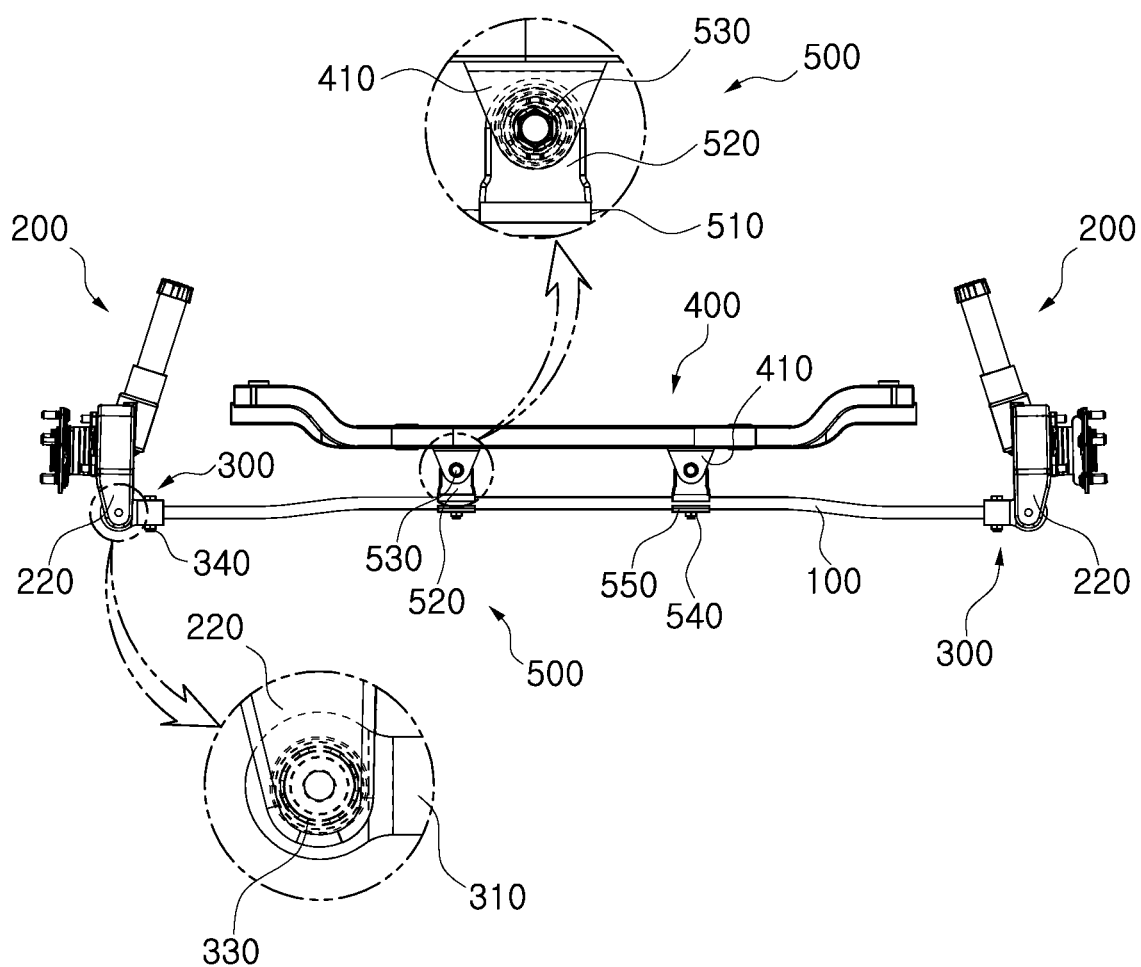
FIG. 4 is a front view schematically illustrating the leaf spring apparatus for a vehicle suspension according to the embodiment of the present disclosure.
Figure 5:
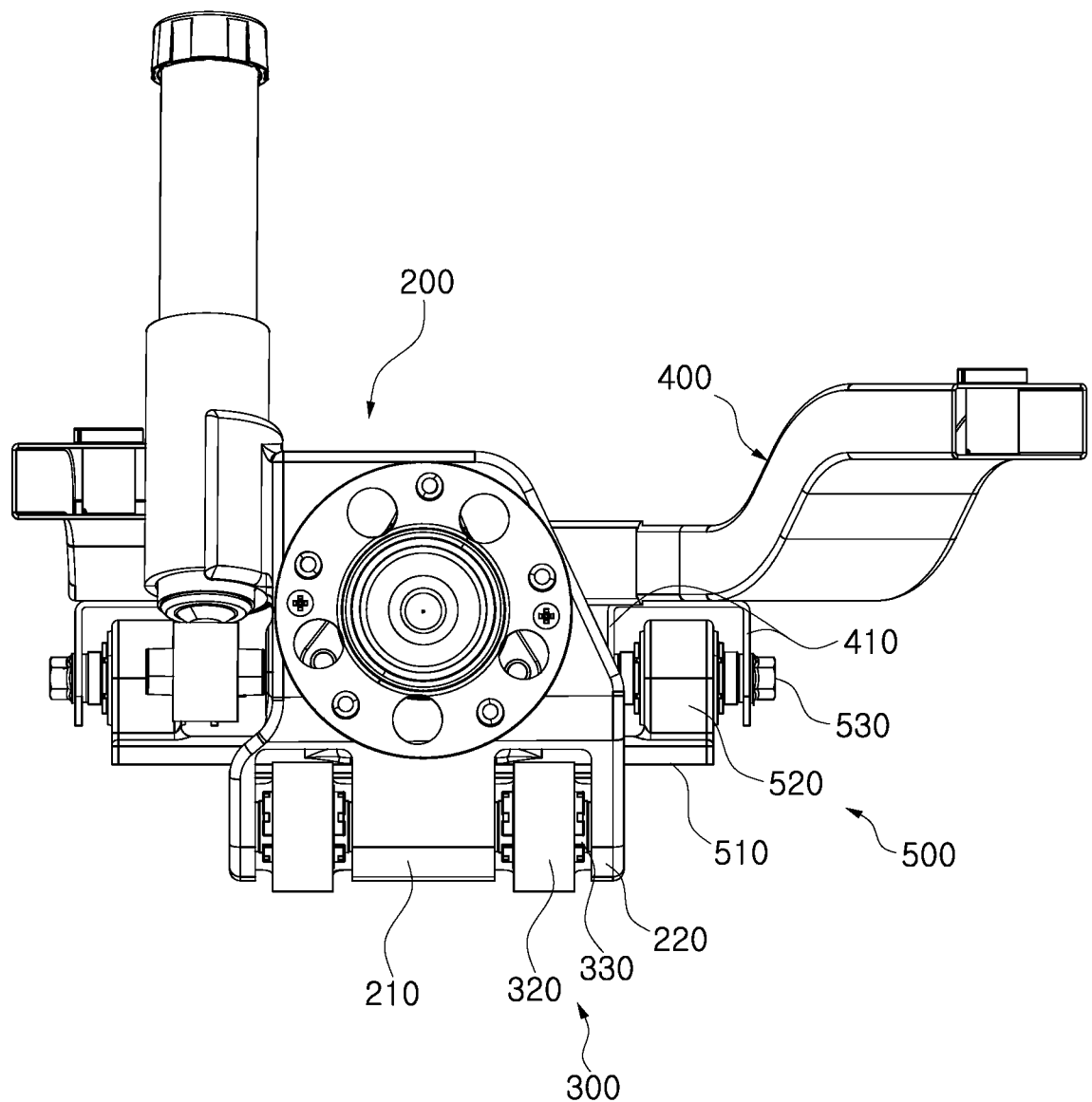
FIG. 5 is a side view schematically illustrating the leaf spring apparatus for a vehicle suspension according to the embodiment of the present disclosure.

FIG. 1 is a perspective view schematically illustrating the leaf spring apparatus for a vehicle suspension according to the embodiment of the present disclosure. FIG. 2 is a perspective view schematically illustrating that the leaf spring apparatus for a vehicle suspension according to the embodiment of the present disclosure is assembled. FIG. 3 is a plan view schematically illustrating the leaf spring apparatus for a vehicle suspension according to the embodiment of the present disclosure. FIG. 4 is a front view schematically illustrating the leaf spring apparatus for a vehicle suspension according to the embodiment of the present disclosure. FIG. 5 is a side view schematically illustrating the leaf spring apparatus for a vehicle suspension according to the embodiment of the present disclosure.

With reference to FIGS. 1 to 5, the leaf spring apparatus for a vehicle suspension according to the embodiment of the present disclosure includes a leaf spring 100, a carrier 200, a first connection unit 300, a cross member 400, and a second connection unit 500.

The first connection unit 300 connects one end portion of the leaf spring 100 to the carrier 200. Both ends of the leaf spring 100 are connected to the carrier 200, respectively. The leaf spring 100 is of a transversal type. The leaf spring 100 is made of glass fiber reinforced plastics (GFRP). That is, the leaf spring 100 is made of a composite material containing a multiplicity of components. The composite-material leaf spring 100 is made of a matrix, such as polymer, metal, carbon, and ceramics, reinforced with fiber, thread-shaped crystal, finely-dispersed particles, or the like.

Since the leaf spring 100 is made of a composite material, such as GFRP, fatigue failure or a defect resulting from corrosion due to humidity or calcium chloride during winter or the like occurs less frequently in the leaf spring 100 than in a metal-material leaf spring. Moreover, a reduction in a weight of the vehicle can improve fuel efficiency.

A pair of carriers 200 are disposed at both end portions of the leaf spring 100, respectively. The carrier 200 is mounted on a wheel (not illustrated) of a vehicle. The carrier 200 rotatably supports the wheel of the vehicle. A central support 210 and a plurality of side supports 220 are formed on one side (the lower side in FIG. 2) of the carrier 200.

The plurality of side supports 220 are arranged to left and right sides, respectively, of the central support 210 in such a manner that they are spaced away from the central support 210. The central support 210 is inserted between a plurality of first hollow portions 320 of the first connection unit 300 that are spaced away from each other. The plurality of side supports 220 are arranged outward from the plurality of first hollow portions 320, respectively. The central support 210 and each of the plurality of side supports 220 are connected to shafts, respectively, formed on end portions of each of the plurality of first rotation supports 330 that are inserted into the plurality of first hollow portions 320, respectively.

The first connection unit 300 connects an end portion of the leaf spring 100 and the carrier 200 to each other. The first connection unit 300 includes a first connection body 310, the plurality of first hollow portions 320, the plurality of first rotation supports 330, and a plurality of first fastening portions 340.

The first connection body 310 is mounted on the end portion of the leaf spring 100. The first connection body 310 is formed in such a manner as to be open at the side that faces the end portion of the leaf spring 100, and the end portion of the leaf spring 100 is accommodated in the first connection body 310. The opening in the first connection body 310 is formed in a manner that corresponds to a shape of the end portion of the leaf spring 100. According to the present disclosure, the end portion of the leaf spring 100 may be pressed into the opening in the first connection body 310.

The plurality of first hollow portions 320 are formed to have a through-hole in the center and protrude from one surface of the first connection body 310. The plurality of first hollow portions 320 are formed to have an inner diameter that is the same as or is greater than an outer diameter of the first rotation support 330. The plurality of first hollow portions 320 are formed on one surface of the first connection body 310 in such a manner as to be spaced away from each other.

According to the present disclosure, the plurality of first hollow portions 320, constituting a pair, are formed on one surface of the first connection body 310 in such a manner as to be spaced away from each other. The central support 210 formed on one side of the carrier 200 is inserted between the plurality of first hollow portions 320 that are spaced away from each other. The plurality of side supports 220 of the carrier 200 are arranged outward from the first hollow portions 320, respectively.

The plurality of first rotation supports 330 are inserted into the plurality of first hollow portions 320, respectively, and rotatably support the carrier 200. The plurality of first rotation supports 330 are formed in the shape of a cylinder, and the shafts are formed on both end portions, respectively, of each of the plurality of first rotation supports 330. The plurality of first rotation supports 330 are inserted into the plurality of first hollow portions 320, respectively. The central support 210 of the carrier 200 and each of the plurality of side supports 220 of the carrier 200 are connected to the shafts, respectively, on each of the plurality of first rotation supports 330.

The plurality of first fastening portions 340 connect the first connection body 310 and the leaf spring 100 to each other. The plurality of first fastening portions 340 each include a first bolt passing through the first connection body 310 and the leaf spring 100 and a first nut that is coupled to an end portion of the first bolt in a screw-fastened manner.

The plurality of first fastening portions 340 that are arranged in a width direction of the leaf spring 100 fasten the first connection body 310 and the end portion of the leaf spring 100 to each other. Therefore, with the plurality of first fastening portions 340, the first connection body 310 and the leaf spring 100 may be kept stably coupled to each other.

The cross member 400 is arranged on top of the leaf spring 100 and supports a body (not illustrated) of the vehicle. The cross member 400 may be formed in shape of the Korean alphabet " ㅛ ," thereby increasing the strength and rigidity of the vehicle body. A plurality of cross bracket portions 410, protruding toward the leaf spring 100, are formed on the cross member 400. The plurality of cross bracket portions 410 are connected to shafts, respectively, formed on end portions of each of a plurality of second rotation supports 530 that are inserted into a plurality of second hollow portions 520, respectively, of the second connection unit 500.

The second connection unit 500 connects the leaf spring 100 and the cross member 400 to each other. The second connection unit 500 includes a second connection body 510, the plurality of second hollow portions 520, the plurality of second rotation supports 530, and a plurality of second fastening portions 540.

The second connection body 510 is arranged on top of the leaf spring 100. The second connection body 510 is arranged on a center portion of the leaf spring 100.

The plurality of second hollow portions 520 are formed to have a through-hole in the center and protrude from both ends, respectively, of the second connection body 510. The plurality of second hollow portions 520 are formed to have an inner diameter that is the same as or is greater than an outer diameter of the second rotation support 530. The second rotation supports 530 are inserted into the plurality of second hollow portions 520 that are formed on the both end portions, respectively, of the second connection body 510 in such a manner that they protrude therefrom. The plurality of cross bracket portions 410 of the cross member 400 are arranged on both sides, respectively, of each of the plurality of second hollow portions 520.

The plurality of second rotation supports 530 are inserted into the plurality of second hollow portions 520, respectively and rotatably support the plurality of cross bracket portions 410 of the cross member 400. The plurality of second rotation supports 530 are formed in the shape of a cylinder, and the shafts are formed on both end portions, respectively, of each of the plurality of second rotation supports 530. The plurality of second rotation supports 530 are inserted into the plurality of second hollow portions 520, respectively, and the plurality of cross bracket portions 410 of the cross member 400 are connected to the shafts, respectively, on both sides of each of the second rotation supports 530.

The plurality of second fastening portions 540 connect the second connection body 510 and the leaf spring 100 to each other. The plurality of second fastening portions 540 each include a second bolt passing through the second connection body 510 and the leaf spring 100 and a second nut that is coupled to an end portion of the second bolt in a screw-fastened manner.

The plurality of second fastening portions 540 fasten the second connection body 510 and the leaf spring 100 along a width direction of the leaf spring 100. Therefore, with the plurality of second fastening portions 540, the second connection body 510 and the leaf spring 100 may be kept stably coupled to each other.

According to the present disclosure, the second connection unit 500 further includes a second connection support 550. The second connection support 550 is provided underneath the leaf spring 100. With a second fastening portion 540, the second connection support 550 is mounted on the leaf spring 100. That is, in a state where the second connection body 510 is arranged on top of the leaf spring 100 and where the second connection support 550 is arranged underneath the leaf spring 100, the second bolt of each of the plurality of second fastening portions 540 passes through the second connection body 510, the leaf spring 100, and the second connection support 550. Nuts of the plurality of second fastening portion 540 are fastened to end portions, respectively, of the second bolts, respectively, of the plurality of second fastening portions 540 in a screw-fastened manner.

The second connection support 550 includes a second connection base 551 and a plurality of second connection lateral portions 553. The second connection base 551 is arranged underneath the leaf spring 100. The second connection base 551 is formed in such a manner that a length in a width direction of the second connection base 551 is the same as a length in a width direction of the leaf spring 100.

The plurality of second connection lateral portions 553 protrude from both end portions, respectively, of the second connection base 551 and surround a lateral surface in the width direction of the leaf spring 100. The surrounding of the lateral surface in the width direction of the leaf spring 100 by the plurality of second connection lateral portions 553 may prevent the leaf spring 100 from being moved in the width direction thereof.

The leaf spring apparatus for a vehicle suspension according to the embodiment of the present disclosure is configured to have the structure described above, as a result of simplifying a leaf spring apparatus for a vehicle suspension in the related art by omitting a lower arm, an assist arm, a trailing arm, an upper arm, a step arm, and a coil spring therefrom or by integrating these components. Accordingly, a packaging space for a vehicle can be secured, and thus a space for mounting a battery or the like can be secured. Thus, the vehicle's weight can be decreased, thereby improving the fuel efficiency.

With the leaf spring apparatus for a vehicle suspension according to the embodiment of the present disclosure, a space for accommodating the battery can be secured, and thus an all-electric range (AER) for an electric vehicle can be increased.

In addition, according to the present disclosure, a space for an occupant can be secured. Thus, the occupant can feel more comfortable in riding in an electric vehicle equipped with the leaf spring apparatus for a vehicle suspension according to the embodiment of the present disclosure.

In addition, according to the present disclosure, the number of components and the man-hours for assembling the components can be reduced, thereby improving the productivity.

In addition, according to the present disclosure, the leaf spring is made of a composite material, such as GFRP. Accordingly, vehicle weight can be reduced, and thus, vehicle fuel efficiency can be improved.

The specific embodiment of the present disclosure is described above. However, the technical idea and the scope of the present disclosure are not limited in scope to the specific embodiment. It would be apparent to a person of ordinary skill in the art to which the present disclosure pertains that various modifications and alterations are possibly made to the specific embodiment within the scope in which the subject matter of the present disclosure that is defined in the claims is not changed.

What is claimed is:

1. A leaf spring apparatus for a vehicle, the apparatus comprising:
   a leaf spring;

a carrier disposed on an end portion of the leaf spring and mounted on a wheel of the vehicle;

a first connection unit connecting the end portion of the leaf spring and the carrier to each other;

a cross member disposed on top of the leaf spring and supporting a body of the vehicle; and a second connection unit connecting the leaf spring and the cross member to each other, wherein the first connection unit comprises:

a first connection body mounted on the end portion of the leaf spring;

one or more first hollow portions formed on a surface of the first connection body and including a through-hole;

one or more first rotation supports inserted into the through-hole of the one or more first hollow portions, respectively, and rotatably supporting the carrier; and a first fastening portion connecting the first connection body and the leaf spring to each other.

2. The leaf spring apparatus of claim 1, wherein the one or more first hollow portions are disposed in a transverse axis of the leaf spring in a width direction of the leaf spring.

3. The leaf spring apparatus of claim 1, wherein an end portion of the first connection body is open at a side that faces the end portion of the leaf spring, and the end portion of the leaf spring is accommodated in the open end portion of the first connection body.

4. The leaf spring apparatus of claim 1, wherein a plurality of first hollow portions are arranged on the surface of the first connection body to be spaced away from each other, and wherein one side of the carrier is inserted between the plurality of first hollow portions.

5. The leaf spring apparatus of claim 4, wherein the plurality of first hollow portions are disposed in a transverse axis of the leaf spring in a width direction of the leaf spring.

6. The leaf spring apparatus of claim 4, wherein the carrier includes a central support and a plurality of side supports on one side of the carrier, and the plurality of side supports are disposed at first and second sides of the central support, respectively.

7. The leaf spring apparatus of claim 6, wherein the central support is inserted between the plurality of first hollow portions of the first connection unit that are spaced away from each other, and wherein the plurality of side supports are disposed outward from the plurality of first hollow portions, respectively, and wherein the one or more first rotation supports inserted into the through-hole of the one or more first hollow portions, respectively, rotatably connect the one or more first hollow portions, the central support and the plurality of side supports of the carrier.

8. A leaf spring apparatus for a vehicle, the apparatus comprising:

a leaf spring;

a carrier disposed on an end portion of the leaf spring and mounted on a wheel of the vehicle;

a first connection unit connecting the end portion of the leaf spring and the carrier to each other;

a cross member disposed on top of the leaf spring and supporting a body of the vehicle; and a second connection unit connecting the leaf spring and the cross member to each other, wherein the second connection unit comprises:

a second connection body disposed on top of the leaf spring;

a plurality of second hollow portions formed on first and second end portions of the second connection body, respectively and having a through-hole;

a plurality of second rotation supports inserted into the plurality of second hollow portions, respectively, and engaged to the cross member to rotatably support the cross member; and a second fastening portion connecting the second connection body and the leaf spring to each other.

9. The leaf spring apparatus of claim 8, wherein the plurality of second hollow portions are disposed in a transverse axis of the leaf spring in a width direction of the leaf spring.

10. The leaf spring apparatus of claim 8, wherein the second connection unit further comprises:

a second connection support disposed underneath the leaf spring and mounted on the leaf spring by the second fastening portion.

11. The leaf spring apparatus of claim 10, wherein the second connection support comprises:

a second connection base disposed underneath the leaf spring; and a plurality of second connection lateral portions protruding from first and second end portions of the second connection base, respectively, and surrounding a lateral surface of the leaf spring in a width direction of the leaf spring.

12. The leaf spring apparatus of claim 11, wherein the second fastening portion connects the second connection base, the leaf spring and the second connecting body.

13. The leaf spring apparatus of claim 1, wherein the leaf spring is made of glass fiber reinforced plastics (GFRP).

14. The leaf spring apparatus of claim 1, wherein the cross member includes a first longitudinal member and a second longitudinal member aligned in a longitudinal axis of the leaf spring, and a first transverse member and a second transverse member aligned in a transverse axis of the leaf spring in a width direction of the leaf spring and connected to the first longitudinal member and the second longitudinal member between distal ends of the first longitudinal member and the second longitudinal member.

* * * * *